United States Patent [19]

Sumiyoshi et al.

[11] 4,450,793

[45] May 29, 1984

[54] INTAKE SYSTEM OF AN INTERNAL COMBUSTION ENGINE

[75] Inventors: Masaharu Sumiyoshi; Katsuhiko Motosugi, both of Toyota, Japan

[73] Assignee: Toyota Jidosha Kogyo Kabushiki Kaisha, Toyota, Japan

[21] Appl. No.: 195,851

[22] Filed: Oct. 10, 1980

[30] Foreign Application Priority Data

Jan. 29, 1980 [JP] Japan .................................. 55-8353

[51] Int. Cl.³ .......................................... F02B 75/18
[52] U.S. Cl. .............................. 123/52 MB; 123/308
[58] Field of Search .............. 123/52 M, 52 MB, 308, 123/306

[56] References Cited

U.S. PATENT DOCUMENTS 2,862,490 12/1958 Trisler ........................... 123/52 MB
4,318,273 3/1982 Nohira et al. ........................ 123/308

FOREIGN PATENT DOCUMENTS 0891339 8/1953 Fed. Rep. of Germany ........ 123/52 MB
54-58129 5/1979 Japan .................................... 123/308
1195060 6/1970 United Kingdom .......... 123/52 MB

*Primary Examiner*—Craig R. Feinberg
*Attorney, Agent, or Firm*—Kenyon & Kenyon

[57] ABSTRACT

An intake system of an internal combustion engine having at least two intake ports formed in the cylinder head. Each of the intake ports comprises an inlet port portion and a port terminating portion formed around the valve stem of the intake valve. Each of the inlet port portions has an opening which is open to the corresponding port terminating portion. The port terminating portions are interconnected to each other via a common connecting passage. The common connecting passage has opposed end openings, each being open to the corresponding port terminating portion at a position opposite to the opening of the corresponding inlet port portion with respect to the valve stem of the corresponding intake valve.

6 Claims, 6 Drawing Figures

Fig. 1

INTAKE SYSTEM OF AN INTERNAL COMBUSTION ENGINE

BACKGROUND OF THE INVENTION

The present invention relates to an intake system of an internal combustion engine.

In a known method of reducing the amount of harmful components in the exhaust gas, a lean air-fuel mixture is used, or a large amount of the exhaust gas is recirculated into the intake system of an engine. However, the propagation speed of the flame of such a lean air-fuel mixture or a mixture containing a large amount of the recirculated exhaust gas therein is low and, thus, the burning velocity is low. Therefore, in the case wherein a lean air-fuel mixture or a mixture containing a large amount of the recirculated exhaust gas therein is used, it is necessary to increase the burning velocity to ensure a stable combustion. In addition, recently there has been a trend to increase engine compression ratios thus improving specific fuel consumption. However, if the compression ratio of an engine is increased, knocking occurs particularly when an engine is operating at a relatively low speed under a heavy load. In order to prevent knocking from occurring, it is necessary to increase the burning velocity. Consequently, to ensure stable combustion without knocking, it is necessary to increase the burning velocity for all operating conditions of the engine.

To increase the burning velocity it is known to cause a strong swirl motion or a strong turbulence in the combustion chamber of an engine by use of a helically shaped intake port, but the volumetric efficiency is reduced when such an engine is operating at a high speed under a heavy load, so that a satisfactory high output power of such an engine cannot be obtained. On the other hand, as an intake system capable of creating a strong turbulence in the combustion chamber while ensuring a high volumetric efficiency when an engine is operating at a high speed under a heavy load, the present applicant has proposed a system in which the intake ports of an engine are interconnected to each other via a common connecting passage having a small cross-sectional area and in which the openings of the common connecting passage, which open to the corresponding intake ports, are directed to the valve gaps formed between the corresponding intake valves and their valve seats when the intake valves open. In this intake system, due to the pressure difference between the pressure or the vacuum produced in the intake ports, a mixture is spouted from the openings of the common connecting passage and flows into the combustion chamber at a high speed via the above-mentioned valve gaps, so a strong swirl motion or a strong turbulence can be created in the combustion chamber without using a helically shaped intake port. However, in this intake system, since the pressure difference between the pressure or the vacuum produced in the intake ports becomes very small when an engine is operating under a heavy load, the amount of mixture spouted from the openings of the common connecting passage becomes extremely small, and it is difficult to create a strong turbulence in the combustion chamber under heavy load conditions. In this intake system, since it is difficult to create a strong turbulence in the combustion chamber when an engine is operating under a heavy load, knocking will occur in an engine equipped with such an intake system if the compression ratio is increased.

An object of the present invention is to provide an internal combustion engine capable of always ensuring a stable combustion and obtaining a high output power without knocking.

According to the present invention, there is provided an internal combustion engine having a cylinder head and at least two cylinders, each having a combustion chamber and an intake valve, at least two intake port passages formed in the cylinder head and connected to the corresponding combustion chambers via the corresponding intake valves, each of said intake port passages comprising a port terminating portion formed around a valve stem of the corresponding intake valve and an inlet port portion having an opening which is open to said port terminating portion, and a common connecting passage formed in the cylinder head and interconnecting said port terminating portions to each other, said common connecting passage having openings formed at opposite ends thereof, each opening being open to said corresponding port terminating portion at a position opposite to the opening of said corresponding inlet port portion with respect to the valve stem of the corresponding intake valve.

The present invention may be more fully understood from the description of preferred embodiments of the invention set forth below, together with the accompanying drawings.

BRIEF DESCRIPTION OF THE DRAWINGS

In the drawings:

FIG. 1 is a cross-sectional plan view of an embodiment of an internal combustion engine according to the present invention, taken along the line I—I in FIG. 2;

DESCRIPTION OF PREFERRED EMBODIMENTS

Figure 1:
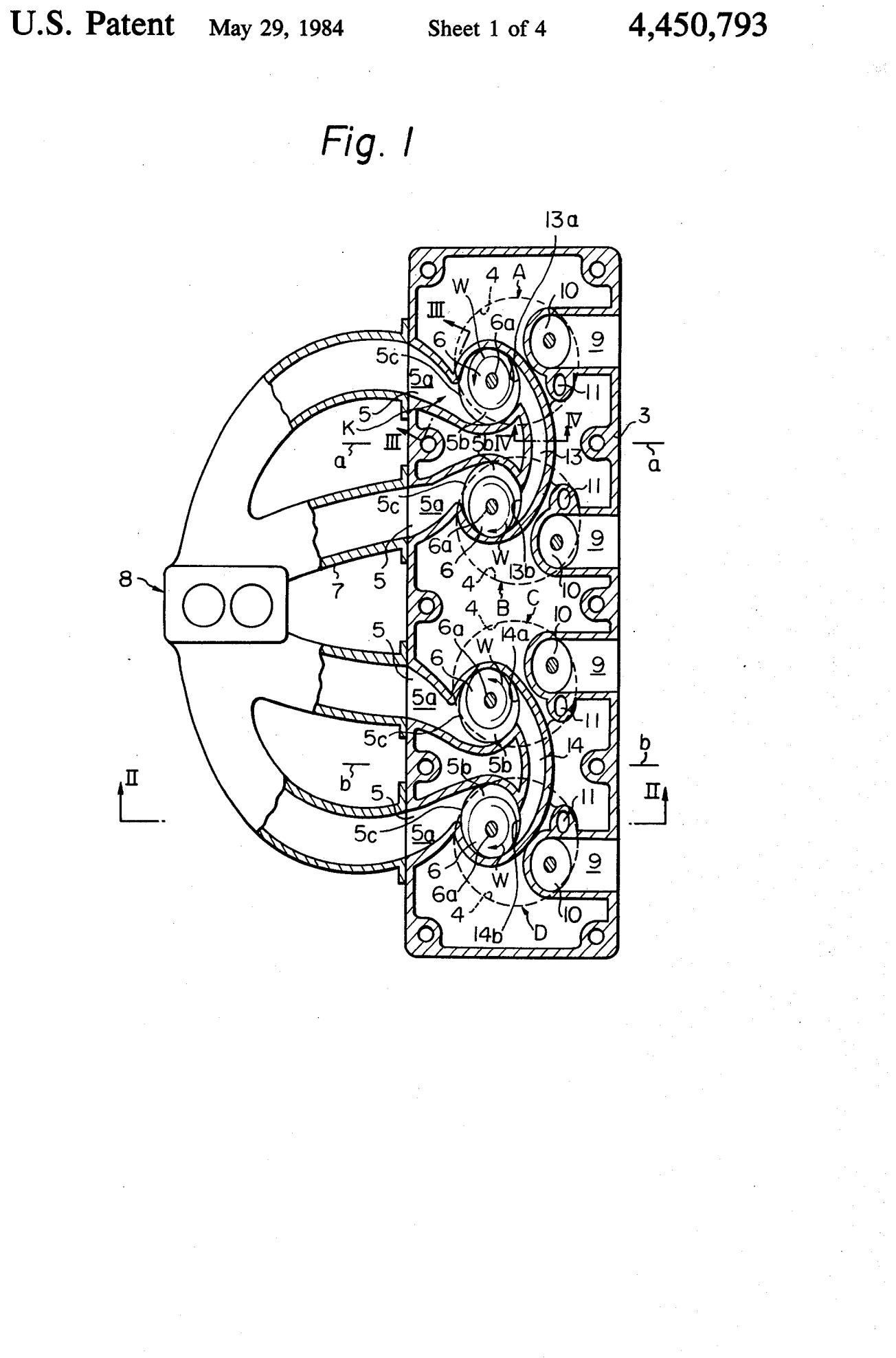
Figure 2:
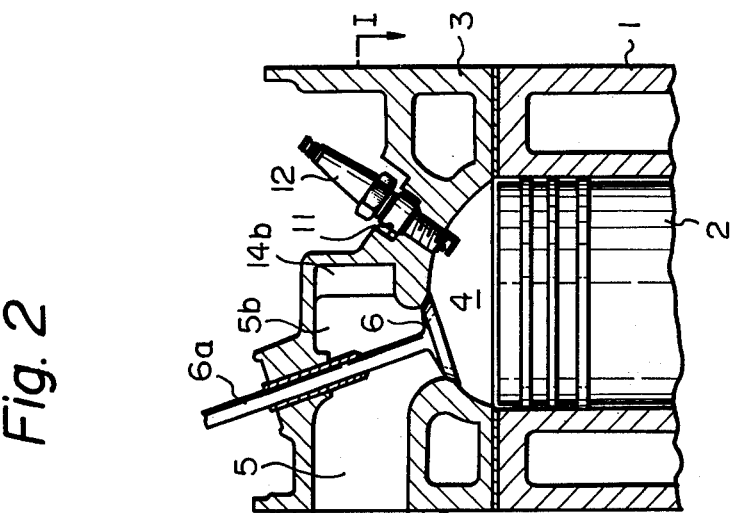
FIG. 2 is a cross-sectional elevation view taken along the line II—II in FIG. 1.
Figure 4:
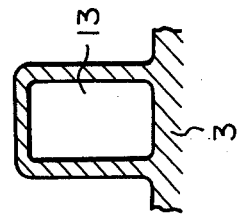
FIG. 4 is a cross-sectional view taken along the line IV—IV in FIG. 1.
Figure 3:
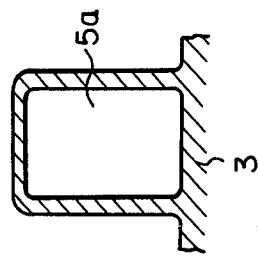
FIG. 3 is a cross-sectional view taken along the line III—III in FIG. 1.

Referring to FIGS. 1 and 2, 1 designates a cylinder block, 2 pistons reciprocally movable in the cylinder block 1, 3 a cylinder head fixed onto the cylinder block 1, and 4 combustion chambers formed between the corresponding pistons 2 and the cylinder head; 5 designates intake ports, 6 intake valves, 7 an intake manifold, and 8 a carburetor; 9 designates exhaust ports, 10 exhaust valves, 11 spark plug receiving holes, and 12 spark plugs screwed into the corresponding holes 11. In addition, in FIG. 1, A, B, C, and D designate a No. 1 cylinder, a No. 2 cylinder, a No. 3 cylinder and a No. 4 cylinder, respectively. With reference to the No. 1 cylinder A and the No. 2 cylinder B in FIG. 1, the intake valves 6 are arranged symmetrically on the top face of the corresponding combustion chamber 4 near a line of symmetry a—a. Furthermore, the intake ports 5 are symmetrical with respect to the line a—a. Similarly with reference to the No. 3 cylinder C and the No. 4 cylinder D in FIG. 1, the intake ports 5 and intake valves 6 are arranged symmetrically with a respect to a line of symmetry b—b.

As illustrated in FIGS. 1 and 2, each of the intake ports 5 comprises a substantially horizontal inlet port portion 5a and a port terminating portion 5b which is formed around a valve stem 6a of the corresponding intake valve 6. In the embodiment illustrated in FIGS. 1 and 2, each of the port terminating portions 5b has a helical shape, and each of openings 5c of the inlet port portions 5a is tangentially connected to the circumferential inner wall of the corresponding helically shaped port terminating portion 5b. Consequently, each of the intake ports 5 illustrated in FIGS. 1 and 2 forms a helically shaped intake port. Therefore, in the intake stroke, mixture flowing into the helically shaped port terminating portions 5b from the corresponding inlet port portions 5a swirls in the helically shaped port terminating portions 5b as illustrated by the arrow W in FIG. 1. Then the mixture flows, while swirling, into the combustion chambers 4 via the corresponding intake valves 6 and, and thus a swirl motion is created in the combustion chambers 4.

As illustrated in FIG. 1, the helically shaped port terminating portion 5b of the No. 1 cylinder A and the helically shaped port terminaing portion 5b of the No. 2 cylinder B are interconnected to each other via a first common connecting passage 13 which is formed in the cylinder head 3. In addition, the helically shaped port terminating portion 5b of the No. 3 cylinder and the helically shaped port terminating portion 5b of the No. 4 cylinder are interconnected to each other via a second common connecting passage 14 which is formed in the cylinder head 3. An opening 13a of the first connectinhg passage 13 is tangentially connectedto the circumferential inner wall of the helically shaped port terminating portion 5b of the No. 1 cylinder A towards the direction illustrated by the arrow W. In addition, an opening 13b of the first common connecting passage 13 is tangentially connected to the circumferential inner wall of the helically shaped port terminating portion 5b of the No. 2 cylinder B towards the direction illustrated by the arrow W. Similarly, an opening 14a of the second common connecting passage 14 is tangentially connected to the circumferential inner wall of the helically shaped port terminating portion 5b of the No. 3 cylinder C towards the direction illustrated by the arrow W. In addition, an opening 14b of the second common connecting passage 14 is tangentially connected to the circumferential inner wall of the helically shaped port terminating portion 5b of the No. 4 cylinder D towards the direction illustrated by the arrow W. Each of the first common connecting passage 13 and the second common connecting passage 14 has a uniform rectangular cross-section over the entire length thereof and has a cross-sectional area which is 0.5 to 1.0 times the cross-sectional area of the minimum cross-sectional portion of the inlet port portion 5a, which is indicated by the arrow K in FIG. 1. In addition, the sum of the cross-sectional area of the above-mentioned minimum cross-sectional portion K and the cross-sectional area of the corresponding common connecting passage 13, 14 is 1.0 to 1.5 times the cross-sectional area of an ordinary intake port.

Assuming that the No. 1 cylinder A is now in the intake stroke, the intake valve 6 of the No. 1 cylinder A opens and the intake valve 6 of the No. 2 cylinder B closes. Consequently, at this time the mixture, formed in the carburetor 8, flows, on one hand, into the helically shaped port terminating portion 5b of the No. 1 cylinder A via the inlet port portion 5a of the No. 1 cylinder A and, on the other hand, into the helically shaped port terminating portion 5a of the No. 1 cylinder A via the inlet port portion 5a and the helically shaped port terminating portion 5b of the No. 2 cylinder B and via the first common connecting passage 13. Consequently, the speed of the swirl motion which is formed in the helically shaped port terminating portion 5b of the No. 1 cylinder A by the mixture flowing from the inlet port portion 5a of the No. 1 cylinder A, is increased by the mixture flowing into the helically shaped port terminating portion 5b of the No. 1 cylinder A from the first common connecting passage 13 as a result, a strong swirl motion is created in the helically shaped port terminating portion 5b of the No. 1 cylinder A. Then, the mixture flows, while swirling, into the combustion chamber 4 via the intake valve 6 and, thus, a strong swirl motion is created in the combustion chamber 4 of the No. 1 cylinder A. Since the speed of the swirl motion created in the helically shaped port terminating portion 5b of the No. 1 cylinder A is increased by the mixture flowing from the first common connecting passage 13 as mentioned above, it is possible to create a strong swirl motion in the combustion chamber 4 even if the engine is operating under a partial or a light load. On the other hand, when the engine is operating at a high speed under a heavy load, since the mixture flows into the helically shaped port terminating portion 5b of the No. 1 cylinder A from the first common connecting passage 13 in addition to the mixture flowing from the inlet port portion 5a of the No. 1 cylinder A, a high volumetric efficiency can be ensured. In addition, even if the engine is operating under a heavy load, a strong swirl motion can be created in the combustion chamber 4. Therefore, it is possible to prevent knocking from occurring even if the compression ratio of the engine is increased.

Furthermore, referring to, for example, the No. 2 cylinder B, the opening 13b of the first connecting passage 13 is arranged at a position opposite to the opening 5c of the inlet port portion 5a with respect to the valve stem 6a of the intake valve 6. Consequently, when the No. 1 cylinder A is in the intake stroke, the mixture, flowing into the helically shaped port terminating portion 5b of the No. 2 cylinder B from the inlet port portion 5a thereof, is able to flow into the first common connecting passage 13 without being subjected to a great flow resistance. Therefore, it is possible to obtain a high volumetric efficiency when the engine is operating at a high speed under a heavy load.

Figure 5:
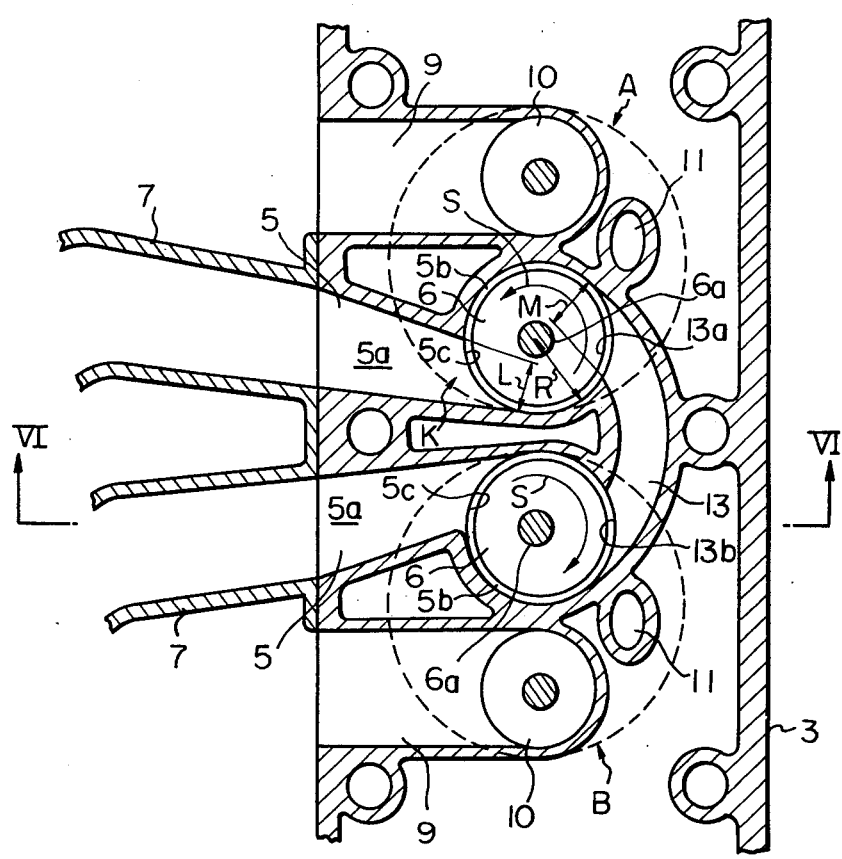
FIG. 5 is a cross-sectional plane view of an alternative embodiment according to the present invention, taken along the line V—V in FIG. 6.
Figure 6:
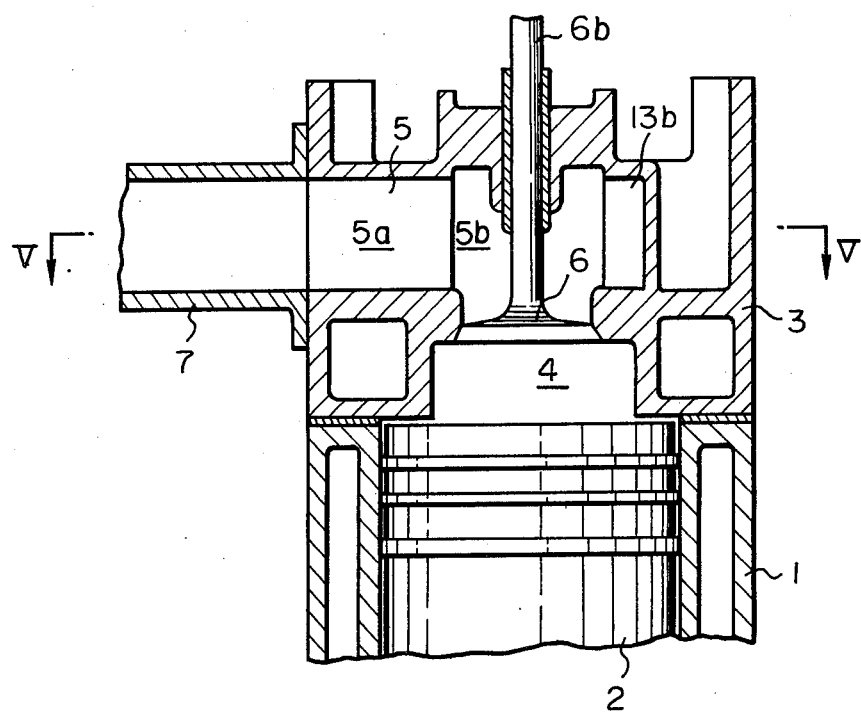
FIG. 6 is a cross-sectional side view taken along the line VI—VI in FIG. 5.

FIGS. 5 and 6 illustrate an alternative embodiment illustrating only the No. 1 cylinder and the No. 2 cylinder. In FIGS. 5 and 6, similar components are indicated with the same reference numerals used in FIGS. 1 and 2. Referring to FIGS. 5 and 6, each of the port terminal portions 5b forms a valve chamber having a cylindrical inner wall, and the openings 5c of the inlet port portions 5a of the intake ports 5 are tangentially connected to the cylindrical inner walls of the corresponding valve chambers 5b towards a circumferential direction illustrated by the arrow S. In addition, the openings 13a and 13b of the first common connecting passage 13 are tangentially connected to the cylindrical inner walls of the corresponding valve chambers 5b towards the direction illustrated by the arrow S. Furthermore, referring to, for exaple, the No. 1 cylinder A in FIG. 5, the inlet port portion 5a and the first common connecting passage 13 are so arranged that both the extension of the opening 5c of the inlet port portion 5a and the extension of the opening 13a of the first common connecting passage 13 do not include the axis of the valve stem 6a of the intake valve 6, that is, the widths L and M are smaller than the distance R between the axis of the valve stem 6a and the cylindrical inner wall of the valve chamber 5b. Also in this embodiment, the first common connecting passage 13 has a cross-sectional area which is 0.5 to 1.0 times the cross-sectional area of the minimum cross-sectional portion of the inlet port portion 5a, which is indicated by the arrow K in FIG. 5, and the sum of the cross-sectional area of the above-mentioned minimum cross-sectional portion K and the cross-sectional area of the first common connecting passage 13 is 1. 0 to 1.5 times the cross-sectional area of an ordinary intake port.

In this embodiment, when the No. 1 cylinder A is in the intake stroke, the mixture flows into the valve chamber 5b of the No. 1 cylinder A from the inlet port portion 5a of the No. 1 cylinder A and the first common connecting passage 13. Since the opening 5c of the inlet port portion 5a and the opening 13a of the first common connecting passage 13 are so arranged that the extensions thereof do not include the axis of the valve stem 6a of the intake valve 6 as mentioned above, the mixture flowing into the valve chamber 5b from the inlet port portion 5a, does not come into a head-on collision with the mixture flowing into the valve chamber 5b from the first common connecting passage 13, so it is possible to create a strong swirl motion in the valve chamber 5b.

In the embodiments illustrated in FIGS. 1 and 5 it is possible to create a strong swirl motion in the helically shaped port terminating portion 5b and the valve chamber 5b, respectively, even if the amount of air fed into the cylinders of the engine is small. However, if is necessary to further increase the speed of the swirl motion created in the helically shaped port terminating portion 5b or the valve chamber 5b when the amount of air fed into the cylinders of the engine is small, throttle valves may be arranged in the first common connecting passage 13 and the second common connecting passage 14 for closing the common connecting passages 13, 14 or reducing the flow area of the common connecting passages 13, 14 when the amount of air fed into the cylinders of the engine is small or when the engine is operating under a light load. That is, in the case wherein such throttle valves are arranged in the common connecting passages 13, 14, a large part of the mixture or all the mixture flows into the helically shaped port terminating 5b or the valve chamber 5b from the inlet port portion 5a when the amount of air fed into the cylinders of the engine is small or when the engine is operating under a light load. As a result, since the velocity of the mixture flowing into the helically shaped port terminating portion 5b or the valve chamber 5b from the inlet port portion 5a is increased, it is possible to create an extremely strong swirl motion in the helically shaped port terminating portion 5b or the valve chamber 5b.

The present invention has been described hereinbefore with reference to the embodiments illustrating the case wherein the present invention is applied to a gasoline engine. However, needless to say, the present invention can be applied to a diesel engine.

According to the present invention, it is possible to create a strong swirl motion or a strong turbulence in the combustion chamber over the entire operating condition of an engine while ensuring a high volumetric efficiency when an engine is operating at a high speed under a heavy load. As a result of this, since the burning velocity is considerably increased even if a lean air-fuel mixture or a mixture containing a large amount of the recirculated exhaust gas is used, a stable combustion can be obtained independently of the operating condition of an engine and, also, a high output power of an engine can be obtained. In addition, even if an engine is operating under a heavy load, a strong swirl motion can be created in the combustion chamber. Therefore, it is possible to prevent knocking from occurring even if the compression ratio of an engine is increased. In addition, in the present invention, since the compression ratio of an engine can be increased, it is possible to improve the specific fuel consumption. Furthermore, the present invention has an advantage in that an intake system according to the present invention can be easily manufactured by a slight change in the construction of conventional intake systems.

While the invention has been described by reference to specific embodiments chosen for purposes of illustration, it should be apparent that numerous modifications could be made thereto by those skilled in the art without departing from the basic concept and scope of the invention.

We claim:

1. An internal combustion engine having a cylinder head,
   at least two cylinders, each having a combustion chamber and an intake valve,
   at least two intake port passages formed in the cylinder head and connected to the corresponding combustion chambers via the corresponding intake valves, each of said intake port passages comprising a port terminating portion having a circumferential wall formed around a valve stem of the corresponding intake valve and an inlet port portion having an opening which is open to said port terminating portion, and
   a common connecting passage formed in the cylinder head and interconnecting said port terminating portions to each other, said common connecting passage having openings formed at opposite ends thereof, each opening being open to said corresponding port terminating portion at a position opposite to the opening of said corresponding inlet port portion with respect to the valve stem of the corresponding intake valve, wherein the improvement comprises:
   the opening of said inlet port portion and the opening of said common connecting passage which are open to the same port terminating portion are oppositely tangentially connected to the circumferential wall of said same port terminating portion towards a same circumferential direction;
   each of said inlet port portions has a minimum cross-sectional portion; and
   said common connecting passage has a uniform rectangular cross-section over the entire length thereof, the cross-sectional area of which is 0.5 to 1.0 times the cross-sectional area of said minimum cross-sectional portion of the inlet port portion.

2. An internal combustion engine as claimed in claim 1, wherein an extension of the opening of said inlet port portion and an extension of the opening of said port terminating portion do not include an axis of the valve stem of the corresponding intake valve.

3. An internal combustion engine as claimed in claim 1, wherein each of said port terminating portions has a helical shape.

4. An internal combustion engine as claimed in claim 1, wherein each of said port terminating portions has a cylindrical inner wall.

5. An internal combustion engine as claimed in claim 1, wherein said inlet port portions are connected to outlets of a common intake manifold.

6. An internal combustion engine as claimed in claim 5, wherein said common intake manifold has a carburetor which is mounted on an inlet thereof.

* * * * *